No. 736,896. PATENTED AUG. 18, 1903.
M. C. WHITE & O. C. DURYEA.
AUTOMATIC FEED MECHANISM.
APPLICATION FILED MAY 23, 1902.
NO MODEL. 2 SHEETS—SHEET 1.
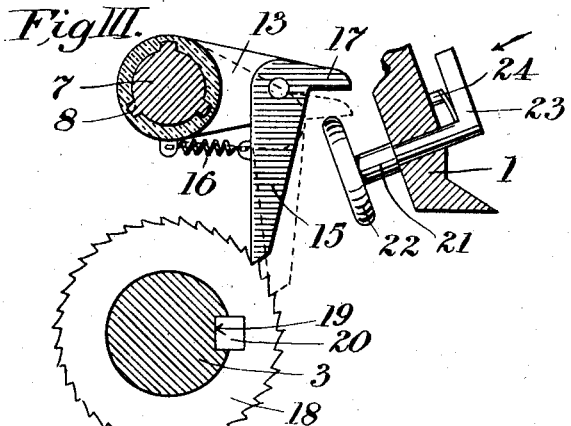
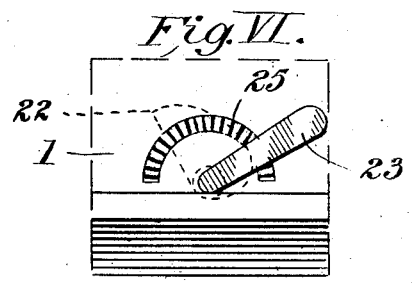
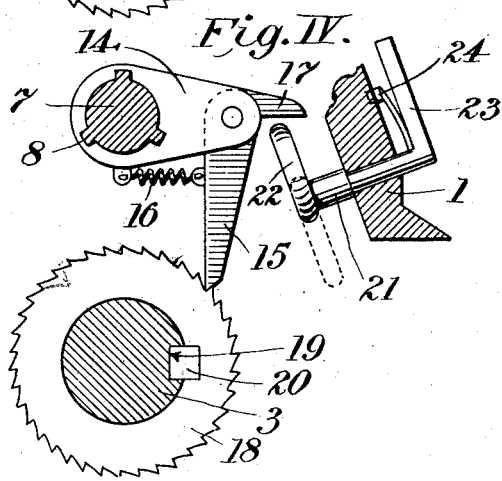
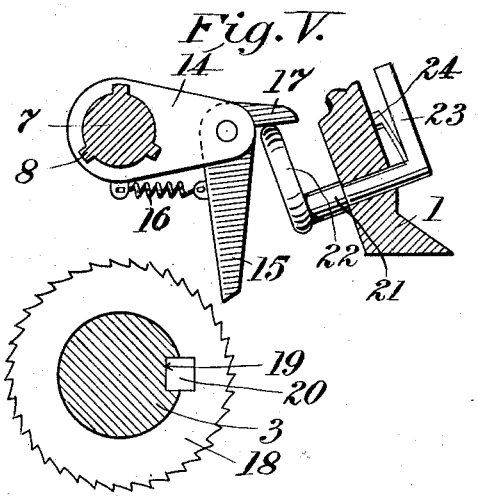
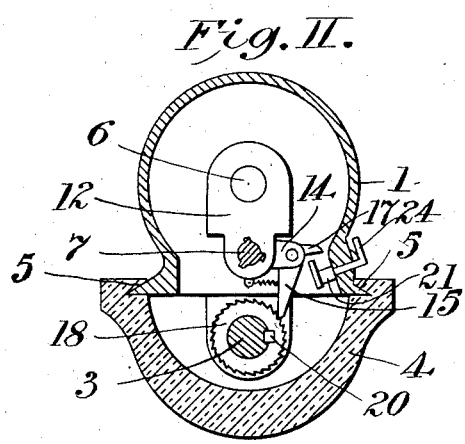
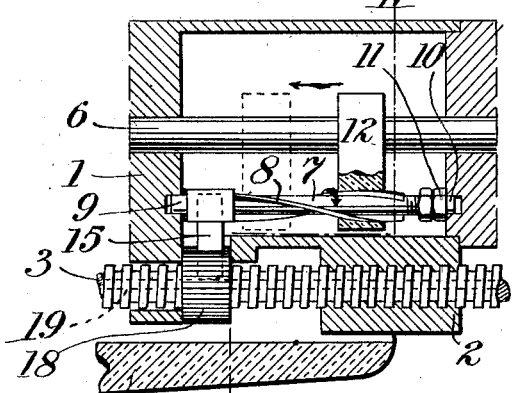
Witnesses:
G. T. Hackley.
Edmund A. Strauss.
Inventors:
Morris C. White
Otho C. Duryea.
by Townsend Bros
Their Attys.

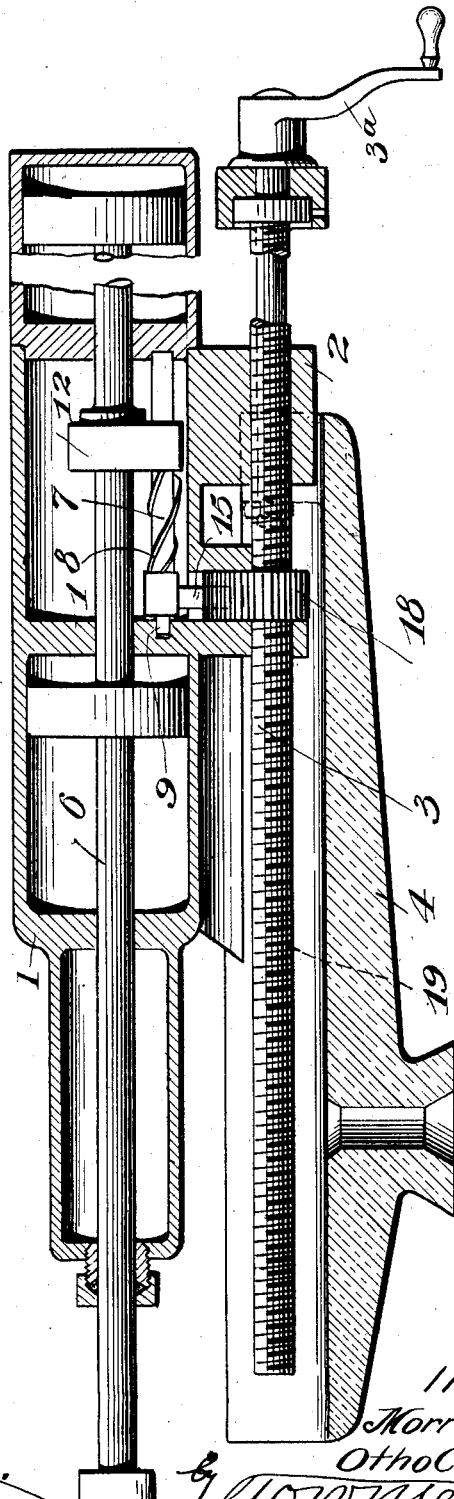

No. 736,896. Patented August 18, 1903.

UNITED STATES PATENT OFFICE.

MORRIS C. WHITE AND OTHO C. DURYEA, OF LOS ANGELES, CALIFORNIA, ASSIGNORS TO NATIONAL FREE PISTON ENGINE COMPANY, (LIMITED,) OF LOS ANGELES, CALIFORNIA, A CORPORATION OF CALIFORNIA.

AUTOMATIC FEED MECHANISM.

SPECIFICATION forming part of Letters Patent No. 736,896, dated August 18, 1903.

Application filed May 23, 1902. Serial No. 108,725. (No model.)

*To all whom it may concern:*

Be it known that we, MORRIS C. WHITE and OTHO C. DURYEA, citizens of the United States, residing at Los Angeles, in the county of Los Angeles and State of California, have invented a new and useful Automatic Feed Mechanism, of which the following is a specification.

Our invention relates to a feeding device particularly adapted to automatically feed the operating parts of a rock-drill.

One object of our invention is to provide a mechanism which may be used on drills having a definite length of stroke or on drills having a variable length of stroke.

Another object is to provide a mechanism which will act automatically to feed the drill according to the length of stroke of the drill.

Another object is to provide a mechanism which may be adjusted to give a desired amount of feed.

Another object is to provide a feed which may be controlled by a single lever, so that the same lever may serve to control the amount of feed and throw the mechanism into or out of operation.

Another object is to provide a mechanism which is simple, compact, and effective in operation.

Referring to the drawings, Figure I is a side elevation of the mechanism, showing it applied to a rock-drill, only a portion of the rock-drill being shown. Fig. II is a section on the line II II of Fig. I. Figs. III, IV, and V are enlarged detail views showing the parts in various positions. Fig. VI is a view of a portion of the mechanism shown in Fig. III looking in the direction of the arrow, Fig. III. Fig. VII is a longitudinal sectional view of a rock-drill equipped with our automatic feed mechanism.

1 is a portion of the frame of a rock-drill.

2 is a projection from the frame forming a nut.

3 is a feed-screw, which may when desired be revolved manually by a crank 3ª.

4 is a base upon which the frame 1 is slidably mounted by ways 5. (See Fig. II.)

6 is a rod which reciprocates with the drill or operating-tool.

7 is a bar provided with spiral ribs 8. The bar 7 is mounted in bearings in the frame 1 at 9 and 10.

11 is a nut for holding the bar from longitudinal play.

12 is an arm carried by the rod 6 to be reciprocated thereby. One end of the arm 12 is perforated and grooved to engage the bar 7. (See Fig. II.)

The bar 7 is provided with lugs 13 and 14.

15 is a pawl pivoted between the lugs 13 and 14.

16 is a spring for yieldingly holding the pawl 15 in operative position.

17 is a lug on the pawl 15.

18 is a ratchet slidably mounted on the screw 3. The screw 3 has a groove 19. The ratchet has a spline 20, which engages the groove 19.

21 is a shaft mounted in the frame 1. One end of the shaft 21 carries a cam 22.

23 is a lever by which the shaft 22 may be rocked.

24 is a spring-detent on the shaft 21, which yieldingly engages notches 25 in the frame 1.

In operation the arm 12 reciprocates and the bar 7 is caused to oscillate by the arm 12 sliding thereon. When the arm 12 moves in the direction of the arrow, which direction of movement indicates the outward travel of the drill, the bar 7 is rocked in the direction of the curved arrow, which draws the pawl 15 over the teeth of the ratchet 18. When the arm 12 moves in the opposite direction, the bar 7 rocks reversely and causes the pawl 15 to rotate the ratchet 18. As the ratchet rotates the screw 3 is turned, which propels the frame 1. If the stroke of the yoke 12 is variable, as it would be in case of the drill having a variable length of stroke, the ratchet is given a relative amount of rotation, because the pawl 15 is moved over the teeth of the ratchet during the entire forward movement of the arm 12, so that during the return stroke of the arm the pawl rotates the ratchet accordingly. The advantage of this construction is that if the drill is taking a relatively short stroke—for instance, while going through granite—the pawl is moved over only a few teeth, and thus on the return stroke it rotates the ratchet a relative degree. Should the drill encounter a soft seam, its length of stroke is increased and the pawl is moved over more teeth during the working stroke of the drill, which turns the ratchet a greater distance during the return stroke. Again, should the drill when working in soft rock encounter a hard seam its stroke accordingly becomes shorter and the pawl is moved over a relatively fewer number of teeth, and thus the ratchet is rotated a degree to correspond with the decreased length of travel of the drill.

The ratio of the amount of feed to the stroke of the drill may be manually regulated by suitably adjusting a means for disengaging the pawl 15 from the ratchet 18 during the working stroke of the pawl. This regulation of the ratio does not affect the automatic variation in feed above described.

When it is desired to reduce the relative amount of feed, the lever 23 is moved to bring the cam 22 into a position such that during the downward stroke of the pawl the lug 17 will strike the cam, which will cause the pawl to be thrown out of engagement with the ratchet. Fig. III shows the pawl in dotted lines as having reached the limit of its engagement with the ratchet. A slight further movement of the pawl will cause it to be disengaged from the ratchet, owing to its lug 17 bearing against the cam 22, the further movement of the pawl during the remainder of the stroke being a rocking motion free from the ratchet. By moving the lever 23 to the proper position the pawl may be tripped at any desired point in its working stroke, thus limiting the rotation of the ratchet accordingly, and thereby regulating the distance that the frame 1 is advanced at each stroke of the drill.

When it is desired to give the maximum amount of feed, the cam may be thrown into the position shown in dotted lines in Fig. IV, in which position it is out of the path of movement of the shoulder 17 and allows the pawl to continue in engagement with the ratchet during its entire working stroke.

When it is desired to throw the feed out of operation to allow of the screw being manually rotated, the lever may be turned into the position shown in Fig. V, which positions the cam accordingly, so that the pawl is entirely disengaged from the ratchet and the screw may be freely turned in either direction. When the pawl is thus freed from the ratchet, it partakes of a rocking movement during its entire working stroke and recovery.

The feed will automatically decrease or increase as the length of strokes of the drill decrease or increase, whether the feed has been regulated for the maximum, minimum, or intermediate rate.

It will be seen that the feed may be regulated to a nicety by suitably positioning the lever 23 and that the same lever will throw the mechanism into or out of operation. The detent 24 yieldingly engages the notches 25, and thus holds the lever at the desired point.

We do not limit ourselves to the specific construction herein shown and described, as it is obvious that many changes may be made herein without departing from the spirit of our invention as defined in the claims.

What we claim, and desire to secure by Letters Patent of the United States, is—

1. A base, a screw thereon, a frame on said base engaging said screw, actuating means engaging said screw, and a reciprocatory part connected to said actuating means by mechanism to rotate said actuating means, means to regulate the amount of actuation of the screw, and means for yieldingly locking said regulating means.

2. A base, a screw thereon, a frame on said base engaging said screw, actuating means engaging said screw, a reciprocatory part connected to said actuating means by mechanism to rotate said actuating means, and means to disconnect said mechanism from said actuating means, and means to yieldingly lock the disconnecting means.

3. A base, a screw thereon, a frame on said base engaging said screw, oscillatory means carried by said frame, a reciprocatory part on said frame engaging said oscillatory means and movable in a path parallel with the axis of said oscillatory means, a ratchet splined on said screw, a connection between said oscillatory means and said ratchet, and means to divert said connection from its normal path of travel.

4. A base, a screw thereon, a frame engaging said screw, oscillatory means carried by said frame, a reciprocatory part on said frame engaging said oscillatory means and movable in a path parallel with the axis of said oscillatory means, a ratchet splined on said screw, a connection between said oscillatory means and said ratchet, and means to disengage said connection from said ratchet, and means for adjusting the disengaging means.

5. A base, a screw thereon, a frame on said base engaging said screw, a bar having a spiral rib, said bar being journaled in bearings on said frame, a reciprocatory part on said frame and having a groove which engages said spiral rib, a ratchet splined to said screw, and a connection between said bar and said ratchet.

6. A base, a screw thereon, a frame on said base engaging said screw, a bar having a spiral rib, said bar being journaled in bearings on said frame, a reciprocatory part on said frame and having a groove which engages said spiral rib, a ratchet splined to said screw, a connection between said bar and said ratchet, and adjustable means to hold said bar from longitudinal movement.

7. A base, a screw thereon, a frame on said base engaging said screw, a bar having a spiral rib, said bar being journaled in bearings on said frame, a reciprocatory part on said frame and having a groove which engages said spiral rib, a ratchet splined on said screw, and a pawl pivoted to said bar, said pawl engaging said ratchet.

8. A base, a screw thereon, a frame on said base engaging said screw, a bar having a spiral rib, said bar being journaled in bearings on said frame, a reciprocatory part on said frame and having a groove which engages said spiral rib, a ratchet splined on said screw, a pawl pivoted to said bar and engaging said ratchet, means to yieldingly hold said pawl against said ratchet, and means movable into the path of movement of said pawl to cause said pawl to disengage from said ratchet.

9. A base, a screw thereon, a frame on said base engaging said screw, a bar having a spiral rib, said bar being journaled in bearings on said frame, a reciprocatory part on said frame and having a groove which engages said spiral rib, a ratchet splined on said screw, a pawl pivoted to said bar and engaging said ratchet, means to yieldingly hold said pawl against the teeth of said ratchet, and adjustable means movable into the path of movement of said pawl, to cause said pawl to disengage from said ratchet.

10. A base, a screw thereon, a frame on said base engaging said screw, oscillatory means carried by said frame, a ratchet splined on said screw, a pawl pivoted to said oscillatory means and engaging said ratchet, means to yieldingly hold said pawl against said ratchet, and rotatably-mounted means movable into the path of movement of said pawl to cause said pawl to disengage from said ratchet.

11. A base, a screw thereon, a frame on said base engaging said screw, oscillatory means carried by said frame, a ratchet splined on said screw, a pawl pivoted to said oscillatory means and engaging said ratchet, means to yieldingly hold said pawl against said ratchet, and adjustable means movable into the path of movement of said pawl to cause said pawl to disengage from said ratchet, and means to yieldingly lock said adjustable means.

12. A base, a screw thereon, a frame on said base engaging said screw, oscillatory means mounted on said frame, a ratchet splined on said screw, a pawl pivoted to said oscillatory means, a shoulder on said pawl, means to yieldingly hold said pawl against said ratchet, and means adjustable into and out of the path of travel of the shoulder of said dog, and means to yieldingly lock said adjustable means.

13. A base, a screw thereon, a frame on said base engaging said screw, actuating means engaging said screw, a reciprocatory part connected to said actuating means by mechanism to rotate said actuating means, and a cam movable into the path of movement of a portion of said connecting mechanism, and means to yieldingly lock said cam.

14. A base, a screw thereon, a frame on said base engaging said screw, actuating means engaging said screw, a reciprocatory part connected to said actuating means by mechanism to rotate said actuating means, and a revoluble cam having a face movable into the path of movement of a portion of said connecting mechanism, and means to rotate said cam.

15. A base, a screw thereon, a frame on said base engaging said screw, actuating means engaging said screw, a reciprocatory part connected to said actuating means by mechanism to rotate said actuating means step by step, and a revoluble cam having a face movable into and out of the path of movement of a portion of said connecting mechanism.

16. A base, a screw thereon, a frame on said base engaging said screw, actuating means engaging said screw, a reciprocatory part on said frame and connected to said actuating means by mechanism to rotate said actuating means, a cam movable into the path of movement of a portion of said connecting mechanism, a shaft carrying said cam, said shaft being mounted in said frame, a handle on said shaft, a detent connected to said shaft, said detent yieldingly engaging said frame.

In witness whereof we have signed our names to this specification, in the presence of two subscribing witnesses, at Los Angeles, in the county of Los Angeles and State of California, this 17th day of May, 1902.

MORRIS C. WHITE.
OTHO C. DURYEA.

Witnesses:
G. T. HACKLEY,
F. M. TOWNSEND.